United States Patent [19]
Abitol et al.

[11] Patent Number: 5,825,476
[45] Date of Patent: Oct. 20, 1998

[54] APPARATUS FOR MAPPING OPTICAL ELEMENTS

[75] Inventors: Marc Abitol, Jerusalem; Ariel Blum, Efrat; Alain Halimi; Elie Meimoun, both of Jerusalem, all of Israel

[73] Assignee: Visionix Ltd., Jerusalem, Israel

[21] Appl. No.: 737,176

[22] PCT Filed: Jun. 13, 1995

[86] PCT No.: PCT/EP95/02283

§ 371 Date: Jan. 6, 1997

§ 102(e) Date: Jan. 6, 1997

[87] PCT Pub. No.: WO95/34800

PCT Pub. Date: Dec. 21, 1995

[30] Foreign Application Priority Data

Jun. 14, 1994 [IL] Israel ........................................ 110016
Mar. 28, 1995 [IL] Israel ........................................ 113172

[51] Int. Cl.⁶ .................................................. G01M 11/02
[52] U.S. Cl. ............................................ 356/124; 356/127
[58] Field of Search ................................. 356/124, 125, 356/127

[56] References Cited

U.S. PATENT DOCUMENTS

| | | | |
|---|---|---|---|
| 3,832,066 | 8/1974 | Cornsweet | 356/127 |
| 3,880,525 | 4/1975 | Johnson | 356/127 |
| 4,007,990 | 2/1977 | McDevitt | 356/124 |
| 4,641,962 | 2/1987 | Sueda | 356/124 |
| 4,725,138 | 2/1988 | Wirth | 356/121 |
| 4,824,243 | 4/1989 | Wheeler | 356/121 |
| 5,062,702 | 11/1991 | Bille | 351/212 |
| 5,083,015 | 1/1992 | Witthoft | 250/201.9 |
| 5,108,174 | 4/1992 | Lippens | 356/124 |
| 5,287,165 | 2/1994 | Ulich | 356/121 |
| 5,301,004 | 4/1994 | Percival et al. | 356/127 |
| 5,488,891 | 2/1996 | Baker | 84/319 |

FOREIGN PATENT DOCUMENTS

| | | |
|---|---|---|
| 213057 | 11/1908 | Germany . |
| 247617 | 5/1910 | Germany . |
| 3318293 | 12/1983 | Germany . |
| 4222395 | 8/1994 | Germany . |
| 61405 | 4/1980 | Israel . |
| 1312511 | 5/1987 | U.S.S.R. . |
| 1420428 | 8/1988 | U.S.S.R. . |

OTHER PUBLICATIONS

G. Cao, et al., Study on the Hartmann–Shack Wavefront Sensor, SPIE (1992) vol. 1752, pp. 112–119.
F. Roddier, Variations on a Hartmann Theme, Optical Engineering (1990) vol. 29, No. 10, pp. 1239–1242.
Malacara, D., et al., 'Testing and Centering of Lenses . . . ' Optical Engineering, vol. 31, No. 7, Jul. 1992, Bellingham, WA, USA, pp. 1551–1555.

Primary Examiner—F. L. Evans
Attorney, Agent, or Firm—Ladas & Parry

[57] ABSTRACT

An apparatus for mapping an optical element, the apparatus including a light source arranged to transmit a light beam toward the optical element, a beam separator including a plurality of beam separating elements, less than all of which are identical, which are operative to separate the light beam into a corresponding plurality of light beam portions including at least first and second light beam portions which differ from one another, an optical sensing device operative to generate a light spot map including a plurality of light spots corresponding to the plurality of beam separating elements and an optical element characteristic computation device operative to derive at least one characteristic of the optical element from the light spot map and including apparatus for identifying the beam separating element corresponding to an individual spot based at least partly on differences between the at least first and second light beam portions.

50 Claims, 10 Drawing Sheets

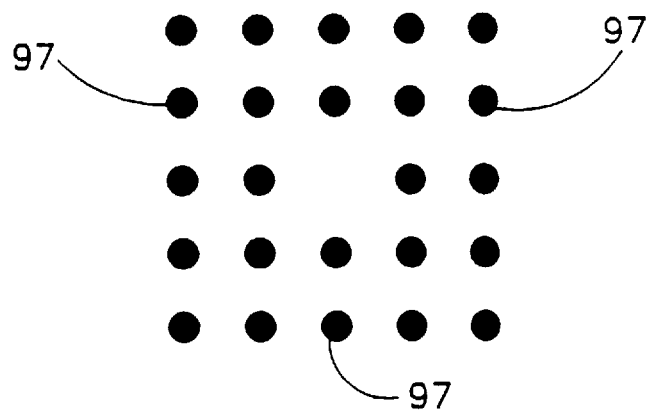
FIG. 18B
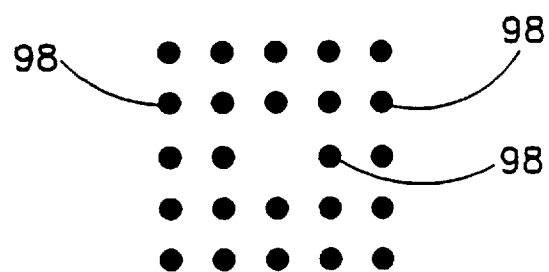
FIG. 18C
FIG. 20A
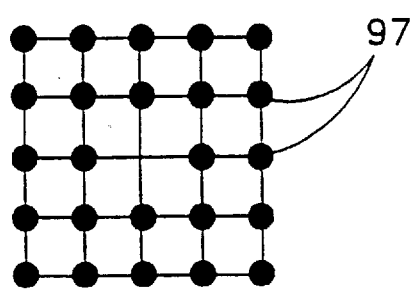
FIG. 20B
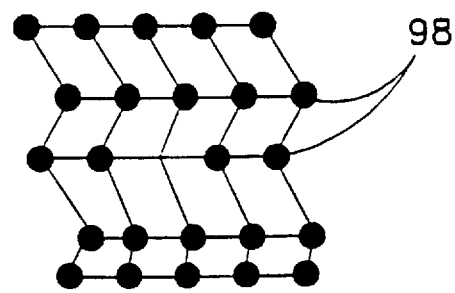

APPARATUS FOR MAPPING OPTICAL ELEMENTS

FIELD OF THE INVENTION

The present invention relates to apparatus for mapping optical elements generally.

BACKGROUND OF THE INVENTION

Apparatus for measuring and mapping optical elements is described in the following U.S. Pat. Nos. 4,725,138; 5,083,015; 3,832,066; 4,007,990; 4,824,243; and 5,287,165.

Apparatus for measuring and mapping optical elements is also described in the following patent documents: German Democratic Republic 247,617 and 213,057; Soviet Union 1,420,428 and 1,312,511; Germany 4,222,395; and in applicant's copending Israel application 110016.

A method and equipment for mapping radiation deflection by phase objects is described in Israel Patent 61405.

A method for measuring ophthalmic progressive lenses is described in C. Castellini, F. Francini, and B. Tiribilli, "Hartmann test modification for measuring ophthalmic progressive lenses", Applied Optics, 1 July 1994, vol. 33, no. 19, pp. 4120–4124.

Mathematical methods useful for mapping lenses are described in Yogeh Jalurig, *Computer Methods for Engineering*, Ally and Bacon, Inc., page 272.

The disclosures of all of the above are hereby incorporated herein by reference.

SUMMARY OF THE INVENTION

The present invention seeks to provide improved apparatus for mapping optical elements.

The present invention relates to a system for the non-contact testing of the optical parameters of optical elements, in particular ophthalmic elements, both transmissive and reflective, across the entire surface thereof, as well as to the testing of molds, mirrors, and the like.

The invention also relates to a method for the non-contact testing of the optical parameters of optical elements, in particular ophthalmic elements.

For the sake of simplicity, the term "optical elements" as used herein is intended to embrace not only elements such as lenses, but also other elements such as molds used in the production of such lenses, as well as other elements such as mirrors. Such elements include spherical and aspherical, bifocal, multi-focal and progressive lenses, as well as molds for producing some of these lenses and, furthermore, hard and soft contact lenses.

While considerable progress has been made in the manufacturing of sophisticated ophthalmic lenses, most of the quality control equipment has been lagging behind and no longer satisfies the needs of the industry and the market.

Most of the instruments used today provide information concerning power that is based in a very small area of the component to be tested (3–4 mm in diameter. Furthermore, they do not provide objective results, requiring, as they do, operator decision. Also, because of the above-mentioned, very restricted measurement area, they cannot deal with progressive lenses, i.e., lenses with continuously changing power.

The instruments used today to analyze surface geometry are mechanical devices which are liable to damage highly polished surfaces (e.g., finished lenses or molds). Testing with these instruments are very time-consuming.

It is thus one of the objectives of the present invention to provide a system that, within a few seconds, provides non-contact, objective measurement of the optical parameters of the entire surface of any optical component.

It is another objective of the invention to permit measurements either by transmission or by reflections.

It is a still further objective of the invention to facilitate automation of the entire measurement process.

According to the invention, the above objectives are achieved by providing a system for the non-contact testing of optical parameters of an optical elements, comprising a light source producing a beam of a diameter substantially covering the entire active surface of said element; an array of microlenses mounted at a distance from, and coaxial with, said light source, said array being of such a size as to substantially cover said active surface of said element; mounting means to mount said element to be tested in transmission, said element being located between said light source and said array of microlenses; a diffusive screen for said array of microlenses, onto which to project a multiple image of said light source; an electronic camera for recording said multiple image off said screen, and a computer for processing said image as supplied by said camera and producing a graphic and/or alphanumeric output.

The invention also provides a method for the non-contact testing of the optical parameters of an optical element, comprising the steps of providing a light source adapted to produce a beam with a wave front of a perdeterminable geometry; at least optically interposing said optical element to be tested between said light source and an array of microlenses of a known geometry; receiving, via said array, multiple images of said light source on a screen; recording said multiple images off said screen; analyzing the geometry of said multiple images as recorded, and comparing the geometry of said multiple images with a reference pattern.

Basically, the system constitutes a wave front analyzer, measurement of the optical elements consisting of the analysis of the front of the wave produced by a light source and passing through, or being reflected by, the element tested. The wave front, modified by the element, is locally sampled and geometrically analyzed by an array of microlenses, each of which creates an image of light source produced on the collective image plane located in the focal plane of the array. In this plane, a CCD camera records the image pattern produced by the array and a data-processing subsystem produces, within a few seconds, a map of the total surface of the optical element tested.

If measurement of the optical element is performed by transmission, the result is a power map of the total element area (in diopters). If measurement is carried out by reflection, the result is a topographic map of the total element area (in millimeters).

There is thus provided in accordance with a preferred embodiment of the present invention a system for the non-contact testing of optical parameters of an optical element, including a light source producing a beam of a diameter substantially covering the entire active surface of the element, an array of microlenses mounted at a distance from, and coaxial with, the light source, the array being of such a size as to substantially cover the active surface of the element, mounting means to mount the element to be tested in transmission, the element being located between the light source and the array of microlenses, a diffusive screen for the array of microlenses, onto which to project a multiple image of the light source, an electronic camera for recording the multiple image off the screen, and a computer for processing the image as supplied by the camera and producing a graphic and/or alphanumeric output.

There is also provided in accordance with another preferred embodiment of the present invention a system for the non-contact testing of optical parameters of an optical element, including a light source producing a beam of a diameter substantially covering the entire active surface of the element, an array of microlenses mounted at a distance from, and in coaxiality with, the element to be tested, a beam splitter mounted between the array of microlenses and the element to be tested in reflection, the beam splitter including substantiality equal angles with the axis connecting the element and the array, and with axis of the light source, a diffusive screen for the array of microlenses, onto which to project a multiple image of the light source, an electronic camera for recording the multiple image off the screen, and a computer for processing the image as supplied by the camera and producing a graphic and/or alphanumeric output.

Further in accordance with a preferred embodiment of the present invention the light source is provided with a collimating lens.

Still further in accordance with a preferred embodiment of the present invention the light source is provided with at least one condenser lens.

Additionally in accordance with a preferred embodiment of the present invention the light source is provided with a pin-hole aperture producing a conical light bundle.

There is also provided in accordance with another preferred embodiment of the present invention a method for the non-contact testing of optical parameters of an optical element, including the steps of providing a light source adapted to produce a beam with a wave front of a predeterminable geometry, at least optically interposing the optical element to be tested between the light source and an array of microlenses of known geometry, receiving, via the array, multiple images of the light on a screen, recording the multiple images off the screen, analyzing the geometry of the multiple images as recorded, and comparing the geometry of the multiple images with a reference pattern.

Further in accordance with a preferred embodiment of the present invention the method includes the step of generating graphic and/or alphanumeric results.

There is also provided in accordance with another preferred embodiment of the present invention apparatus for mapping an optical element, the apparatus including a light source arranged to transmit a light beam toward the optical element, a beam separator including a plurality of beam separating elements operative to separate the light beam into a corresponding plurality of light beam portions, an optical sensing device operative to generate a light spot map including a plurality of light spots corresponding to the plurality of beam separating elements, and an optical element characteristic computation device operative to derive at least one characteristic of the optical element from the light spot map and including apparatus for identifying the beam separating element corresponding to an individual spot based at least partly on information other than the location of the spot.

Further in accordance with a preferred embodiment of the present invention the light spot map includes a digital light spot map.

Still further in accordance with a preferred embodiment of the present invention the light spot map includes an analog light spot map.

Additionally in accordance with a preferred embodiment of the present invention the deflector includes an LCD (liquid crystal device).

Moreover in accordance with a preferred embodiment of the present invention the deflector includes an array of microlenses.

Further in accordance with a preferred embodiment of the present invention the deflector includes a hole plate.

Still further in accordance with a preferred embodiment of the present invention the optical sensing device includes a CCD camera.

Additionally in accordance with a preferred embodiment of the present invention the optical sensing device includes an IR camera.

Moreover in accordance with a preferred embodiment of the present invention the optical sensing device includes a photographic film.

Further in accordance with a preferred embodiment of the present invention the optical sensing device includes a PSD (position sensor detector).

Still further in accordance with a preferred embodiment of the present invention the light source includes a point source.

Additionally in accordance with a preferred embodiment of the present invention the light source includes a coherent light source.

Moreover in accordance with a preferred embodiment of the present invention the coherent light source includes a laser source.

Further in accordance with a preferred embodiment of the present invention the light source includes a noncoherent light source.

Still further in accordance with a preferred embodiment of the present invention the noncoherent light source includes one of the following: a tungsten light source, and a halogen light source.

Additionally in accordance with a preferred embodiment of the present invention the apparatus for identifying also employs information regarding the location of the spot to identify a beam separating element corresponding to an individual spot.

Moreover in accordance with a preferred embodiment of the present invention the light source includes a parallel light source operative to transmit parallel light toward the optical element.

Further in accordance with a preferred embodiment of the present invention the light source includes a convergent light source operative to transmit converging light toward the optical element.

Still further in accordance with a preferred embodiment of the present invention the light source includes a divergent light source operative to transmit diverging light toward the optical element.

Additionally in accordance with a preferred embodiment of the present invention the computation device is operative to derive at least one local characteristic of the optical element.

There is also provided in accordance with another preferred embodiment of the present invention a method for mapping an ophthalmic element including illuminating an ophthalmic element, providing a plurality of beam separating elements operative to separate a light beam into a corresponding plurality of light beam portions, generating a digital light spot map including a plurality of light spots corresponding to the plurality of beam separating elements, and deriving at least one ophthalmic element characteristic.

Further in accordance with a preferred embodiment of the present invention the deriving step includes deriving at least one local ophthalmic element characteristic.

Still further in accordance with a preferred embodiment of the present invention the ophthalmic element includes an ophthalmic lens.

Additionally in accordance with a preferred embodiment of the present invention the ophthalmic element includes an ophthalmic mold.

Moreover in accordance with a preferred embodiment of the present invention the ophthalmic lens includes a contact lens.

Further in accordance with a preferred embodiment of the present invention the contact lens includes a hard contact lens.

Still further in accordance with a preferred embodiment of the present invention the contact lens includes a soft contact lens.

Additionally in accordance with a preferred embodiment of the present invention the soft contact lens is immersed in a solution.

Moreover in accordance with a preferred embodiment of the present invention the ophthalmic lens includes an intraocular lens.

There is also provided in accordance with another preferred embodiment of the present invention apparatus for mapping an ophthalmic lens including a light source arranged to transmit light toward the ophthalmic lens, a beam separator including a plurality of beam separating elements operative to separate a light beam into a corresponding plurality of light beam portions, an optical sensing device operative to generate a digital light spot map including a plurality of light spots corresponding to the plurality of beam separating elements, and an ophthalmic characteristic map generating device operative to generate a map of an ophthalmic characteristic of the ophthalmic lens based on the light spot map.

Further in accordance with a preferred embodiment of the present invention the ophthalmic characteristic map includes an astigmatism map.

Still further in accordance with a preferred embodiment of the present invention the ophthalmic characteristic map includes an axis map.

Additionally in accordance with a preferred embodiment of the present invention the ophthalmic characteristic map includes a tilt map.

Moreover in accordance with a preferred embodiment of the present invention the ophthalmic characteristic map includes a curvature radius map.

There is also provided in accordance with another preferred embodiment of the present invention a method for mapping an IR optical element including illuminating an IR optical element, providing a plurality of beam separating elements operative to separate a light beam arriving into a corresponding plurality of light beam portions, generating a digital light spot map including a plurality of light spots corresponding to the plurality of beam separating elements, and deriving at least one IR optical element characteristic.

There is also provided in accordance with another preferred embodiment of the present invention apparatus for mapping an optical element including a light source arranged to transmit light toward the optical element, a beam separator including a plurality of beam separating elements operative to separate a light beam into a corresponding plurality of light beam portions, an optical sensing device operative to generate a digital light spot map including a plurality of light spots corresponding to the plurality of beam separating elements, and an aberration polynomial computation device operative to derive an aberration polynomial characterizing the optical element from the light spot map.

Further in accordance with a preferred embodiment of the present invention the apparatus also includes a beam splitter positioned between the light source and the optical element which is operative to split the light beam returning from the optical element toward the optical sensing device.

Still further in accordance with a preferred embodiment of the present invention the optical sensing device is on one side of the optical element and the light source is on the other side of the optical element.

There is also provided in accordance with another preferred embodiment of the present invention apparatus for mapping an optical element, the apparatus including a light source arranged to transmit a light beam toward the optical element, a beam separator including a plurality of beam separating elements operative to separate a light beam arriving from the light source into a corresponding plurality of light beam portions before impingement of the light beam on the optical element, an optical sensing device operative to generate a digital light spot map including a plurality of light spots corresponding to the plurality of beam separating elements, and an optical element characteristic computation device operative to derive at least one characteristic of the optical element from the light spot map.

Further in accordance with a preferred embodiment of the present invention the at least one characteristic of the optical element includes at least one characteristic of only one surface of the optical element.

Still further in accordance with a preferred embodiment of the present invention the at least one ophthalmic element characteristic includes at least one ophthalmic characteristic of only one surface of the optical element.

Additionally in accordance with a preferred embodiment of the present invention the at least one IR optical element characteristic includes at least on IR optical element characteristic of only one surface of the IR optical element.

Moreover in accordance with a preferred embodiment of the present invention the aberration polynomial characterizes only one surface of the optical element.

BRIEF DESCRIPTION OF THE DRAWINGS

The present invention will be understood and appreciated from the following detailed description, taken in conjunction with the drawings in which:

FIG. 18B is a simplified pictorial diagram illustrating calibration spots produced during step 105 of FIG. 18A;

FIG. 18C is a simplified pictorial diagram illustrating test spots produced during step 110 of FIG. 18A;

FIGS. 20A and 20B are simplified pictorial illustrations of a result of step 140 of FIG. 19;

DETAILED DESCRIPTION OF PREFERRED EMBODIMENTS

Figure 1:
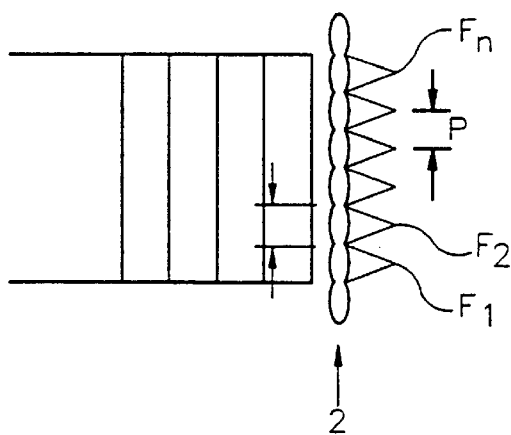
FIG. 1 represents the array of focal points as produced by plane wave front passing through an array of microlenses.
Figure 2:
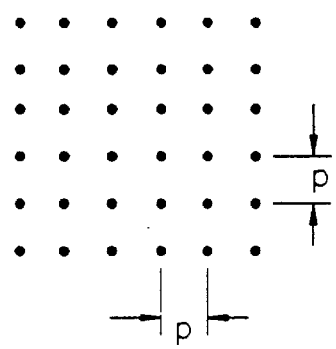
FIG. 2 represents the image produced by the array of microlenses of FIG. 1.

Referring now to the drawings, there is seen in FIG. 1 a microlens array 2 with lenses of a diameter d. When, as shown, the array 2 is impacted by a plane wave front, the lenses focus at f1, f2 . . . fn in the collective focal plane, with the pitch p of the foci f in this case being p=d. If a screen were mounted in the focal plane, the multiple images of the light source (not shown) producing that wave front would appear as in FIG. 2, with the pitch in both directions being p.

Figure 3:
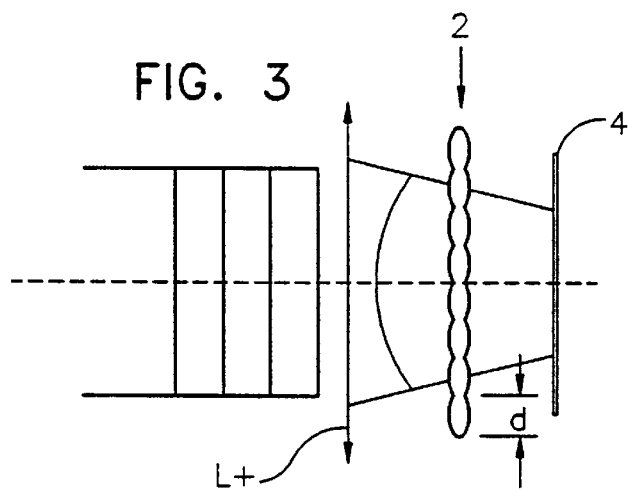
FIG. 3 shows the effect of introducing a positive lens between the light source and the array of microlenses.
Figure 4:
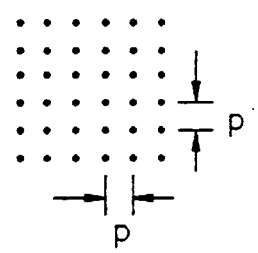
FIG. 4 is the image produced by the setup of FIG. 3.

When, as in FIG. 3, a positive lens L+ is interposed between the light source and the array 2, the above multiple image, produced on a screen 4, would appear as in FIG. 4, but with p<d.

Figure 5:
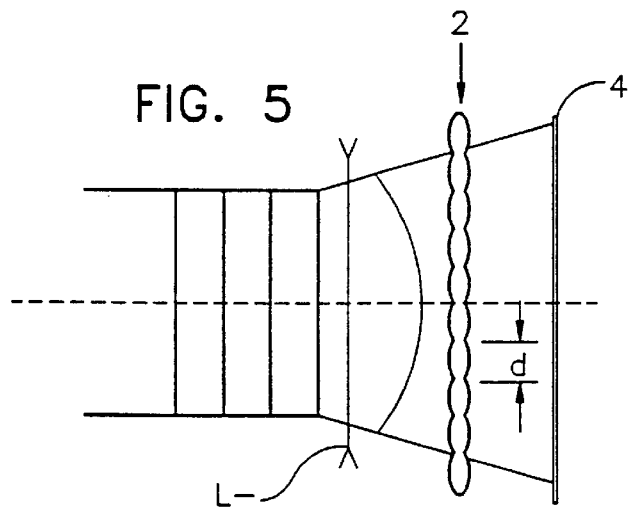
FIG. 5 shows the effect of introducing a negative lens into the setup.
Figure 6:
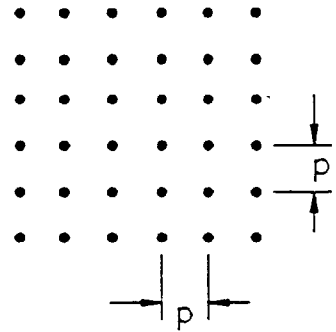
FIG. 6 is the image produced by the setup of FIG. 5.

Conversely, with a negative lens L- interposed between light source and array 2 as shown in FIG. 5, the image would appear as in FIG. 6, with p>d.

As will be explained in detail further below, the image on screen 4 is recorded by a CCD camera and processed by a computer.

FIGS. 7–12 represent various special lenses and the specific multiple images produced by them with the system according to the invention.

Figure 7:
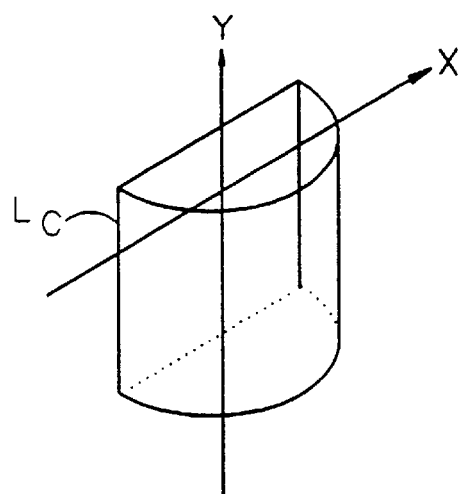
FIG. 7 represents a cylindrical lens.
Figure 8:
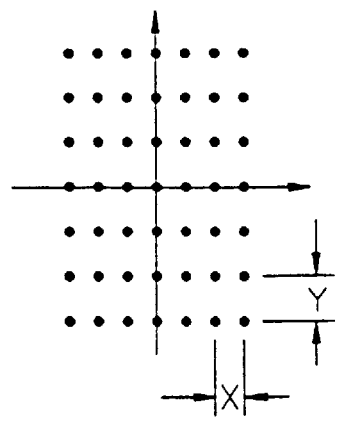
FIG. 8 is the image pattern of the lens of FIG. 7.

FIG. 7 represents a cylindrical lens having both an X and a Y axis. In the image of FIG. 8 as produced by array 2 (not shown), X<Y.

Figure 9:
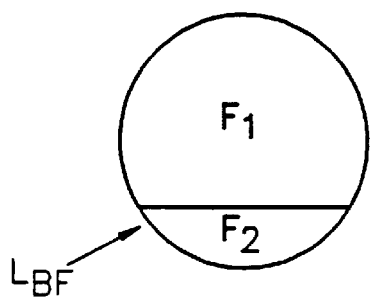
FIG. 9 shows a bifocal lens.
Figure 10:
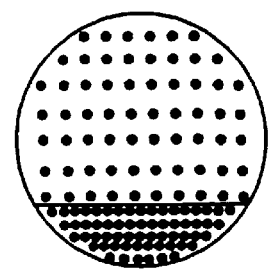
FIG. 10 presents the image pattern of the lens of FIG. 9.

FIG. 9 shows a bifocal lens LBF having a focal length f1 in its upper part and a focal length f2 in its lower part. The image pattern produced by array 2 is shown in FIG. 10. It is seen that the density of the image points in the upper part of the lens is lower than that in the lower part.

Figure 11:
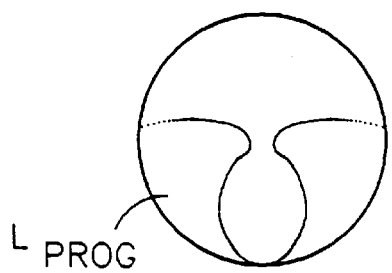
FIG. 11 presents a progressive lens.
Figure 12:
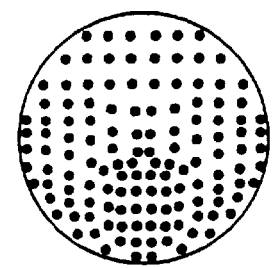
FIG. 12 represents the image pattern of the lens FIG. 11.

The lens in FIG. 11 is a so-called progressive lens Lprog, the focal length of which varies across the surface thereof.

This is clearly shown in the image pattern of FIG. 11 where the zones of different power and the transitions between them appear as image points of different densities.

Figure 13:
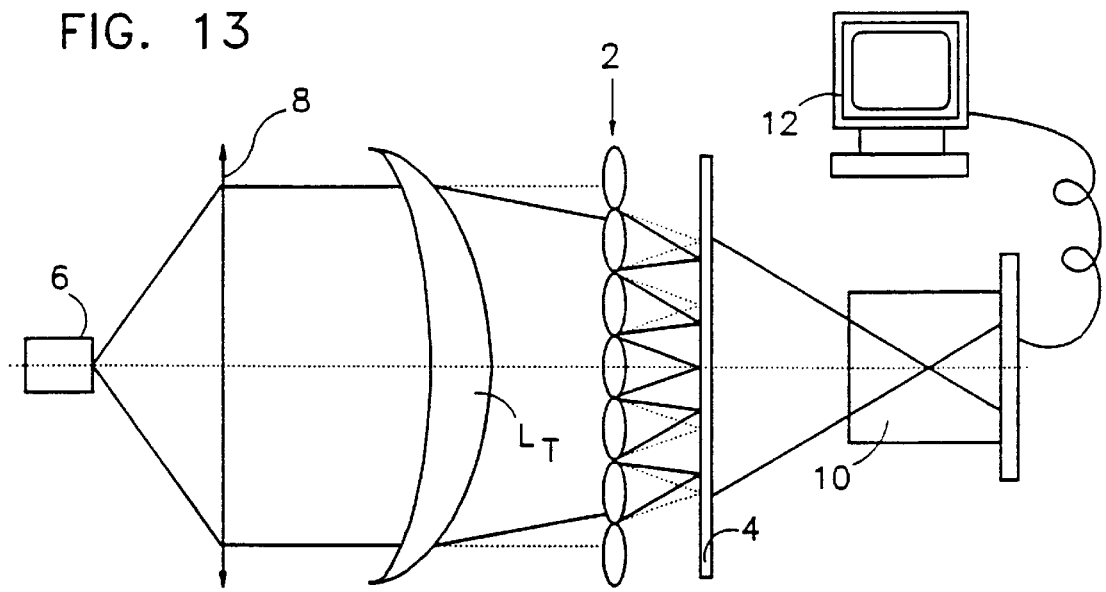
FIG. 13 illustrates a setup of the system in which an optical component is tested in transmission.
Figure 15:
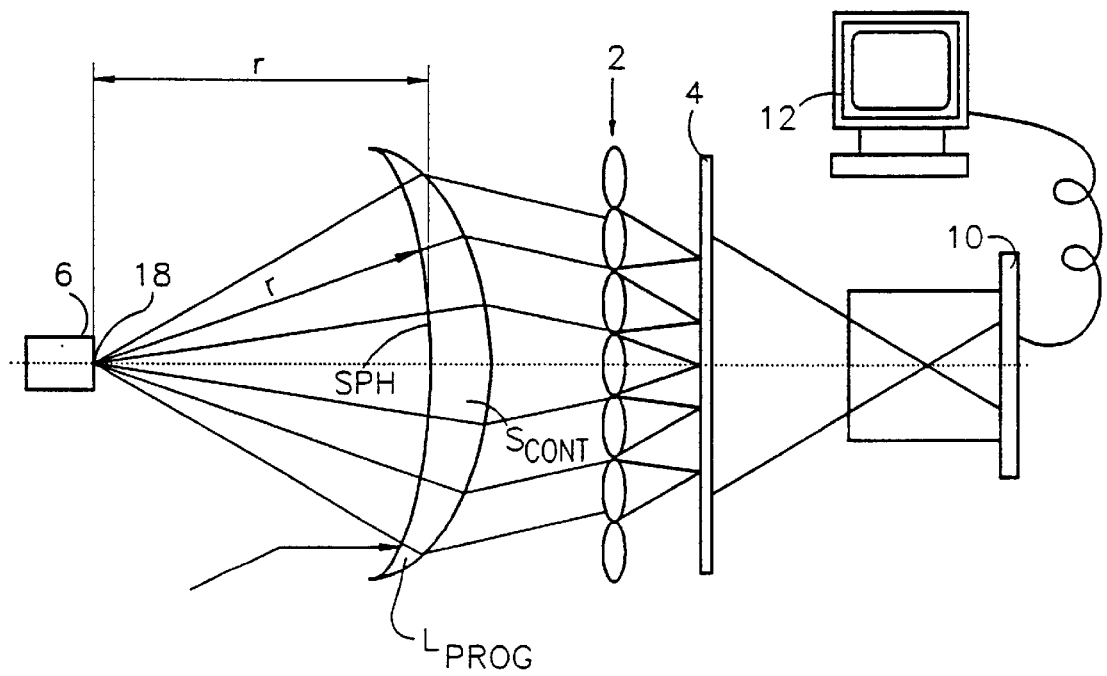
FIG. 15 illustrates the testing of the front surfaces of a progressive lens in transmission.
Figure 14:
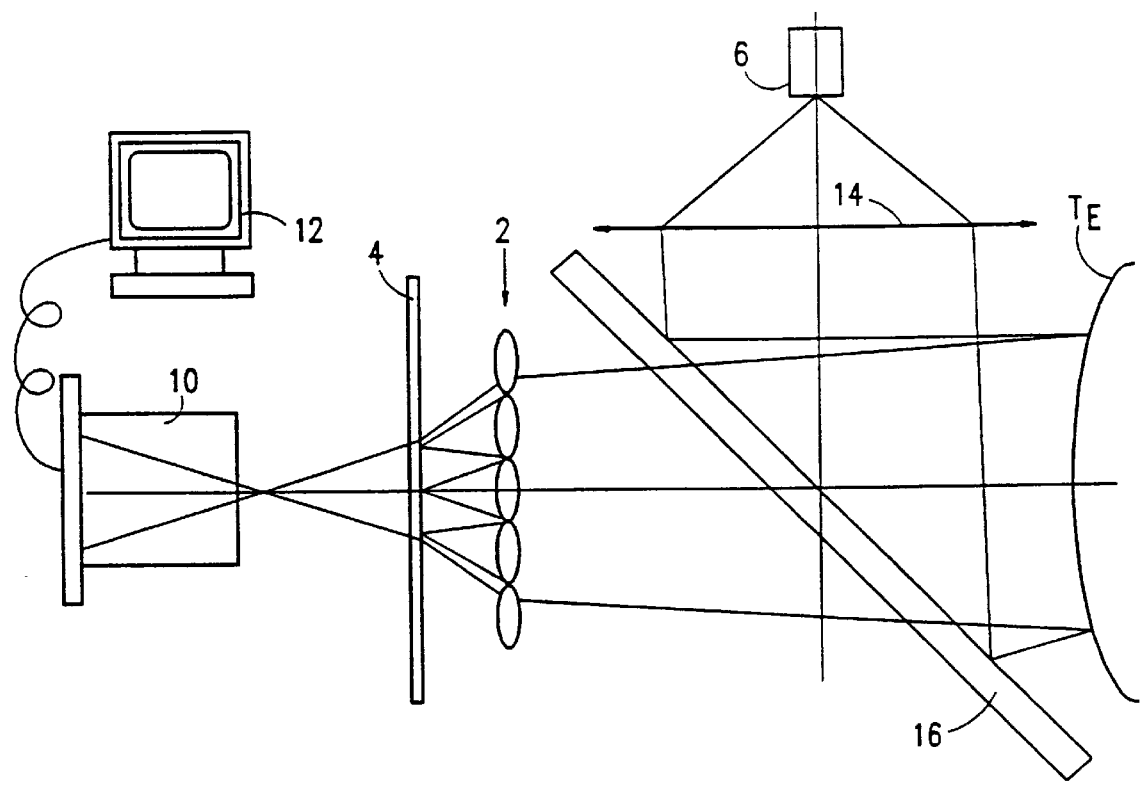
FIG. 14 represents a setup in which the front surface of the element is tested in reflection.

FIGS. 13–15 schematically represent the system according to the invention.

In FIG. 13 there is seen a light source 6 which is preferably white and need not be coherent, although a HeNe laser (0.6 microns) can be used. A collimator lens 8 is provided to produce a beam having a plane wave front. Further seen is the microlens array 2. The array used in an experimental version of the system had the following specifications, which should be seen by way of example only:

| | |
|---|---|
| Lens diameter | 1 mm |
| Focal length of lenses | 5–10 mm |
| Number of lenses | 40 × 40 = 1600 |
| Pitch of lenses | 3 mm |
| Overall size of array | ⁻120 mm |

Also seen is a diffusive screen 4 on which appear the multiple images of light source 2 as modified by the lens to be tested LT. These images are recorded by a CCD camera 10, the output of which is transferred to computer 12, where the images are processed. The system of FIG. 13 clearly works by transmission.

A reflective system according to the invention is schematically illustrated in FIG. 14. Such a system is intended for analyzing one surface only of a tested lens of when elements are to be tested.

There are seen in FIG. 14 a light source 6, a condenser lens 14, a beam splitter 16, the microlens array 2 and its screen 4, a CCD camera 10 and a computer 12. The beam from light source 6 is seen to fall onto beam splitter 16, onto array 2, producing the already-discussed image pattern. This pattern is recorded by CCD camera 10 and is analyzed in computer 12.

It will be noticed that, in this case, the beam is not parallel as in the previous embodiment, but converging. This is done in order to reduce the size of the lens array required, since the convex surface of the test element would turn a parallel beam into a diverging one, which would demand a much larger array 2.

The embodiment of FIG. 15 enables the progressive surface of a progressive lens to be tested in transmission rather than reflection, as was the case in FIG. 14.

There is seen in FIG. 15 a high-intensity light source 6 with a pin-hole aperture 18. The progressive lens Lprog is mounted at a distance r from the pin hole, where r is the radius of curvature of the spherical rear surface SSPH and will therefore pass the rear surface SSPH without being refracted. While a certain amount of energy will be reflected back into the pin hole 18, the main portion of the light will be refracted at the continuous front surface SCONT.

Image processing, carried out in the computer with the aid of an acquisition card, includes the following steps:

1) Assessment of all image-point locations at pixel accuracy.

2) Determination of the centroid of all point at sub- pixel accuracy (1/10–1/30 pixel) by modellization of the Gaussian spot and thus locating the energetic center.

3) Determination of the shift of the centroid by comparison with a reference image.

4) Converting the above shift into a topographical map of the lens.

For deeper analysis, that is, for analysis of the common aberrations, use is made of the polynomial of Zernike, whereby it is possible to determine the different optical aberrations in the order of the polynomial with the coefficients of each of the terms of the polynomial taken in a certain order, indicating the contribution to total lens imperfection of a given aberration.

Figure 16:
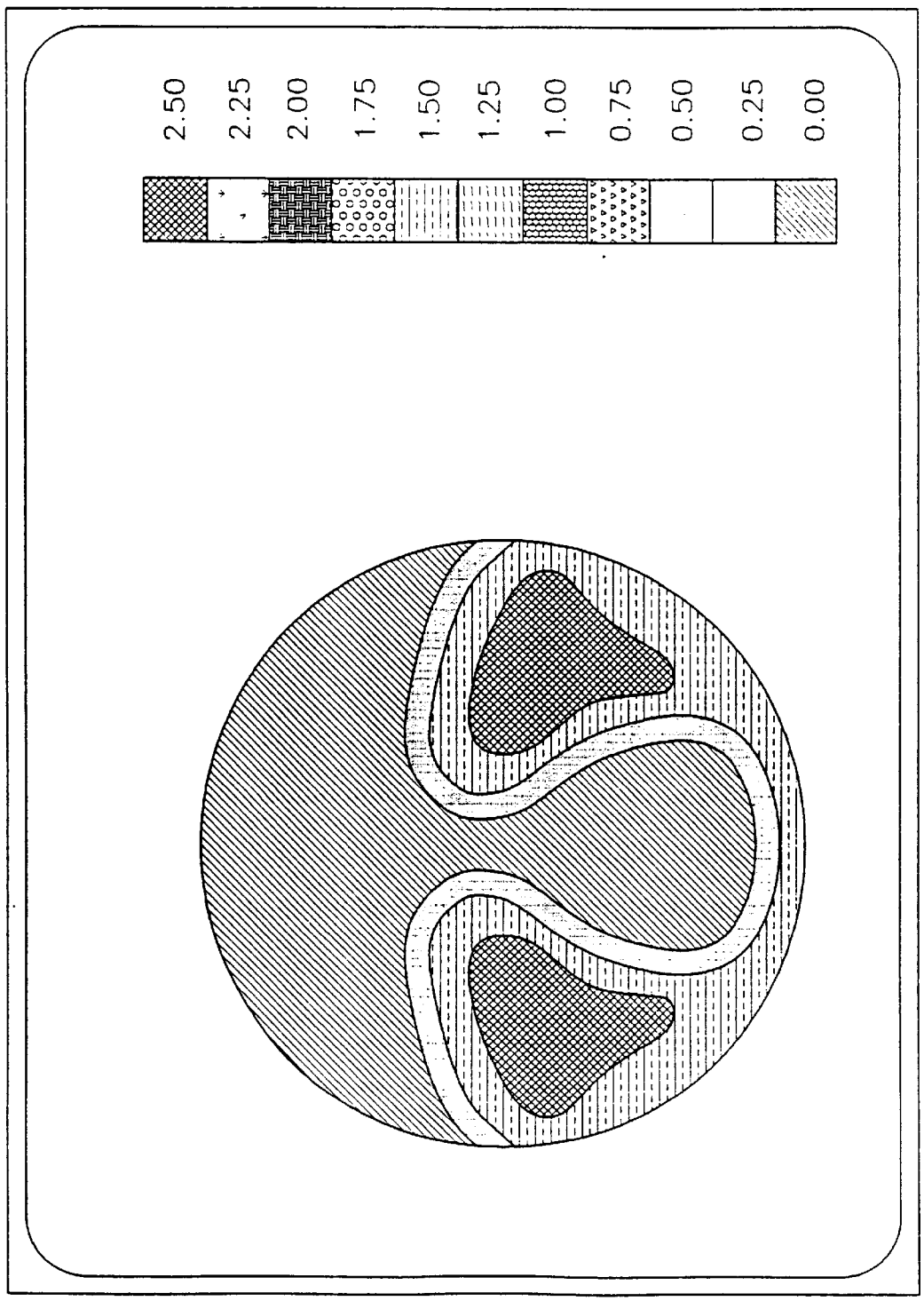
FIG. 16 is a cylindrical map of a progressive lens, including a power scale relating the different shadings to local power.

The output of the system as working in transmission will be a topographical cylindrical map, as shown in FIG. 16. Unlike the present illustration, which is shaded to indicate coloring, the real map is colored and so is the associated power scale, which relates the different shadings to local power. It is also possible to calculate the maximum power, the axis and the prism of the tested lens.

Output of the system as working in reflection will be in the form of a physical topographical map, colored as the map of FIG. 16, but with the color differences indicating differences in height between the topographical outlines, or a table which will give on each x,y position on the lens the real height of the surface.

The system according to the invention is easily automated by the provision of a robot arm which takes the appropriate mount and, according to the test results, separates the serviceable from the faulty lenses.

Figure 17A:
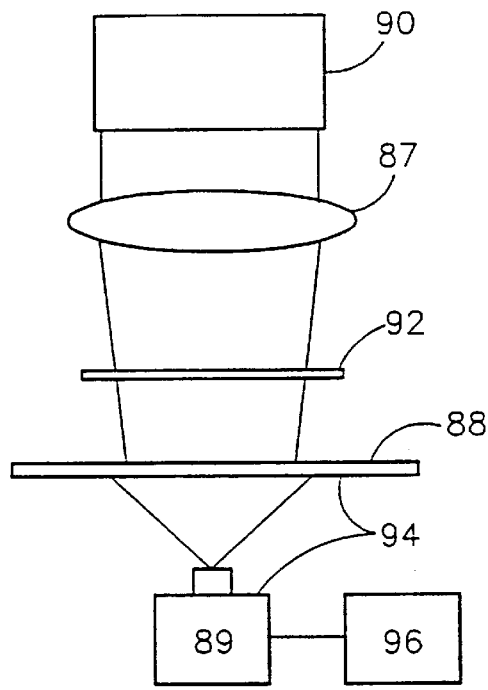
FIG. 17A is a simplified partly pictorial, partly block diagram illustration of apparatus for mapping an optical element, the apparatus constructed and operative in accordance with an alternative preferred embodiment of the present invention.
Figure 17B:
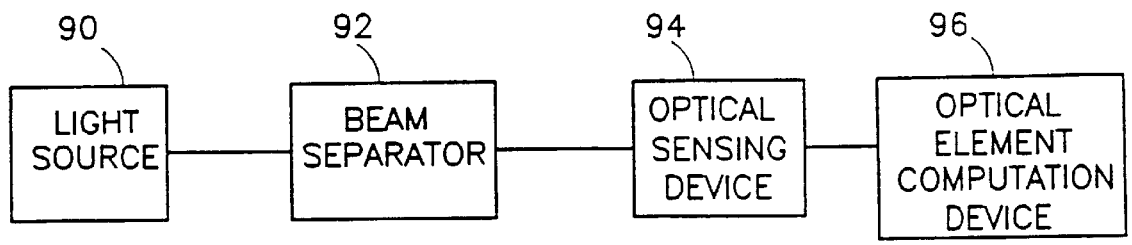
FIG. 17B is a simplified block diagram of the apparatus of FIG. 17A.

Reference is now made to FIGS. 17A and 17B. FIG. 17A is a simplified partly pictorial, partly block diagram illustration of apparatus for mapping an optical element, the apparatus constructed and operative in accordance with an alternative preferred embodiment of the present invention, while FIG. 17B is a simplified block diagram of the apparatus of FIG. 17A. The configuration of FIG. 17A comprises a light transmission configuration using a parallel beam.

Shown in FIG. 17A is an optical element 87, which is to be tested by the apparatus of FIGS. 17A and 17B. The optical element 87 may be any of a number of different kinds of optical element, including an ophthalmic or non-ophthalmic optical element; a mold; or a lens of any of a number of types, including an ophthalmic lens, a hard or soft contact lens possibly immersed in a solution, or an intraocular lens. It is appreciated that many other types of optical element may also be used.

The apparatus of FIGS. 17A and 17B includes a light source 90, which may, for example, generally be either a coherent or a non-coherent light source, including: a laser, such as a diode laser; a white light source, such as a halogen light; an IR (infrared) source; or a tungsten light source. Typically, a halogen light with a parabolic reflector may be used as, for example, item 7106-003 commercially available from Welch Allyn, 4619 Jordan Road, P.O. Box 187, Skaneateles Falls, N.Y. 13153-0187, USA. In the case where the optical element 87 is an IR optical element, an IR source is preferred.

The apparatus of FIGS. 17A and 17B also includes a beam separator 92, which may be, for example, one of the following:
  an array of microlenses, such as, for example, an array of 100×100 microlenses, typically equally spaced, each of 1.0 mm diameter and focal length of 50 mm, commercially available from Visionix, Ltd., 21 Vaad Haleumi, Jerusalem, Israel;
  a hole plate, such as, for example, a plate containing an array of 40×40 holes, typically equally spaced, each of 300 micron diameter, interhole distance 2.5 mm, commercially available from Visionix, Ltd., 21 Vaad Haleumi, Jerusalem, Israel; or
  an LCD (liquid crystal device).

Generally, an array of microlenses is preferred, although a hole plate may typically be used because an array of microlenses is often more expensive.

In any case, one of the plurality of microelements of the beam separator 92 as, for example one of the microlenses or one of the holes, is replaced with a non-light-transmitting material, so that no beam of light is produced by the replaced microlens or hole. Preferably, the replaced microlens or hole is located generally in the center of the array of microlenses or holes and is referred to hereinbelow as a "missing element".

The apparatus of FIGS. 17A and 17B also includes an optical sensing device 94. Typically, the optical sensing device comprises a screen 88, shown in FIG. 17A, upon which light beams may be projected. The screen 88 is typically an optical matte screen. The optical sensing device 94 typically also comprises a camera 89, shown in FIG. 17A, such as, for example:
  a CCD camera such as a Burle model TC65 CCD camera, commercially available from Maagal Sagour Ltd., 11 Hosheha St., Bnei Berak 51364, Israel;
  an IR camera, preferred when an IR light source is used;
  photographic film; or
  a PSD (position sensor detector), such as a UTD model PDH.4 available from UDT sensors, Inc., 12525 Chadron Ave., Hawthorne, Calif. 90250, USA.
Generally, a CCD camera is preferred.

The apparatus of FIGS. 17A and 17B also includes an optical element computation device 96 which may be, for example, an appropriately programmed IBM compatible personal computer equipped with a 66 MHz 80486 processor and an image processing card with acquisition ability, such as a frame grabber card with analog to digital termination, available commercially from CEFAR Ltd., Har Hotsvim, Phasecom Building, Jerusalem, Israel.

In the case where photographic film is used in the optical sensing device 94, within the camera 89, the film must be examined after developing and data derived from the film must be manually or automatically input to the optical element computation device 96. In this case, acquisition capability is not required in the image processing card referred to above. In the case of photographic film, the sensed data is termed analog data, while in the case of the other examples of a camera given above, the sensed data is termed digital data.

Figure 18A:
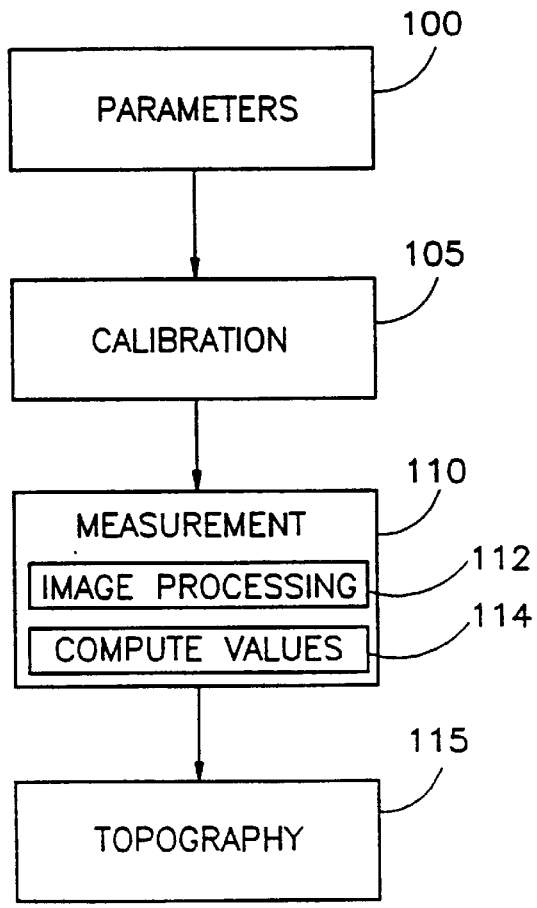
FIG. 18A is a simplified flow chart illustrating the operation of the optical element computation device 96 of FIG. 17B.

Reference is now made to FIG. 18A which is a simplified flow chart illustrating the operation of the optical element computation device 96 of FIGS. 17A and 17B. The method of FIG. 18A includes a preferred set of steps to be taken by the user in order to operate the apparatus of FIGS. 17A and 17B. The method of FIG. 18A preferably includes the following steps:

STEP 100: Parameters. The user may optionally input control parameters that govern the method of FIG. 18A. Parameters may, for example, comprise the following:
  integration number, indicating how many times an image of the optical element 87 is to be acquired;
  optical element parameters, typically comprising:
    sagittal;
    diameter; and
    refractive index and, in the case where the optical element 87 is submerged in a liquid, the refractive index of the liquid;
  structural parameters of the apparatus, typically comprising:
    maximum number of microelements, such as microlenses or holes, along an axis of the beam separator 92;

distance between microelements, such as microlenses or holes, along an axis of the beam separator 92;

distance between the beam separator 92 and the screen 88 typically found in optical sensing device 94; and distance between the optical element 87 and the beam separator 92;

erosion parameters, described in detail below with reference to FIG. 19, including window size along both axes, and erosion threshold;

output parameters, typically comprising:

type of map, such as sphere, cylinder, astigmatism, tilt, curvature radius, or axis;

step of the measurement;

scaling of output.

STEP 105: Calibration. A measurement is taken without including the optical element 87 in the apparatus.

Reference is now additionally made to FIG. 18B, which is a simplified pictorial diagram illustrating calibration spots produced during step 105 of FIG. 18A. FIG. 18B comprises a plurality of calibration spots 97. A relatively small number of calibration spots 97 is shown in FIG. 18B for illustrative purposes. Generally, the number of test spots is equal to the number of microelements in the beam separator 92. For example, in the case where the beam separator 92 comprises a 100×100 microlens, there are generally 10,000 calibration spots 97.

The location of the calibration spots 97 is recorded in memory as the basis for future measurement. Typically, the distance between any two adjacent calibration spots 97 in the horizontal direction is substantially the same as the distance between any other two adjacent calibration spots 97 in the horizontal direction, and similarly in the vertical direction. This is because, as explained above with reference to FIGS. 17A and 17B, the distance between elements of the beam separator 92 is typically substantially equal. Nevertheless, small variations tend to make the spacing of the calibration spots 97 slightly uneven. Therefore, the horizontal and vertical positions of each of the calibration spots 97 is stored for use in future computations.

Each of the calibration spots 97 is assigned a unique label, as, for example, an integer. The label of each of the test spots 97 is stored for future computation STEP 110: Measurement. The test optical element is inserted as shown in FIG. 17A. Reference is now additionally made to FIG. 18C, which is a simplified pictorial diagram illustrating test spots produced during step 110 of FIG. 18A. FIG. 18C comprises a plurality of test spots 98. It will be seen that the tests spots 98 are in different positions than the corresponding calibration spots 97 of FIG. 18B. The positions are different because the optical element 87 inserted in the light paths has refracted or reflected the light beams so that the light beams impinge on different locations, thus causing the test spots 98 to be in different positions than the calibration spots 97.

Measurement comprises the following steps 112 and 114:

STEP 112: Image processing: the positions of the test spots 98 are acquired and processed to determine which of the calibration spots 97 is associated with each of the test spots 98, and thereby to determine which microelement of the beam separator 92 is associated with each of the calibration spots 97 and each of the test spots 98. Step 112 is described in more detail below with reference to FIG. 19.

STEP 114: The optical characteristics of the test optical element are computed, preferably by using the following equations. In equations 1–18b, discussed below, the following symbols are used:

i, j: identifying numbers of calibration spots 97 and test spots 98;

x, y: Cartesian positions of calibration spots 97;

x', y': Cartesian positions of test spots 98;

X, Y: Cartesian distances between two spots;

D: distance between the beam separator 92 and the screen.

Equations 1 and 2, found below, define computation of X and Y.

Equations 3a and 3b, found below, define computation of the displacement between one of the calibration spots 97 and the corresponding test spot 98.

Equations 4a and 4b, found below, define computation of the displacement of a given pair of associated spots 97 and 98 and the displacement of another pair of associated spots 97 and 98, thus defining a measure of density.

Equations 5–8, found below, define values used in subsequent equations, where the subscripts "12" and "13" define the "i,j-values" of the respective displacements.

Equation 9a, found below, defines the local maximum power of the optical element.

Equation 9b, found below, defines the local minimum power of the optical element.

Equation 9c, found below, defines the local cylindrical surface of the optical element.

Equation 9d, found below, defines the local average power of the optical element.

Equations 10a–10d, found below, define values used in equation 11.

Equation 11, found below, defines the local axis of the optical element.

Equations 12a and 12b are described below, with reference to FIG. 19.

The above computations, explained with reference to equations 1–11, comprise a computation of a numerical topography of the power of the lens. Alternatively, an aberration polynomial such as the Zernike polynomial, which is well known in the art and may be preferred by opticians, may be used. Alternatively, another appropriate aberration polynomial may be used.

Equation 13a, found below, defines the Zernike polynomial. A best fit between the numerical data and the Zernike polynomial is computed, using methods well known in the art. A typical method to fit the data to the Zernike polynomial is the Gaussian method, described in Yogeh Jalurig, *Computer Methods for Engineering*, Ally and Bacon, Inc., page 272.

Alternatively or additionally, it is possible to compute a radius of curvature map for either of the two surfaces of the lens, or of both surfaces separately. The configurations of FIGS. 22 and 23, referred to below, are particularly suitable for this purpose. Two measurements are performed, with two different positions of the screen 88. For each position, computations similar to those described above with reference to Equations 1–11 are performed.

First, the computations of Equations 1–3, described above, are performed for each position of the screen 88. Then, for each position of the screen 88, the following computations are performed.

For each of the test spots 98 on the screen 88 in the first position, the corresponding test spot on the screen 88 in the second position is identified, as explained above in step 112 and below with reference to FIG. 19, by relating to the corresponding calibration positions. The two corresponding test spots 98 define a straight line which intersects with the optical element 87 on its inner surface, where the inner surface is defined as the surface closest to the screen 88.

Generally, the radius of curvature of one of the two surfaces of the optical element 87 is given in order to simplify computation of the characteristics of the other surface. This simplifying assumption is made because, typically, progressive lenses are sphero-cylindrical on one surface, the surface of given curvature, and are of complex shape on the other surface, the surface to be measured. Alternatively, the optical element 37 may have only one optical surface as, for example, in the case of a mirror. By way of example, the present discussion will assume that the radius of curvature of the inner surface is already known. It is appreciated that similar computations may be performed if the radius of curvature of the outer surface is already known.

Equation 13b, found below, expresses Snell's Law. Equation 13b is used to find the perpendicular to the outer surface of the optical element 87 which intersects the position of the associated microelement of the beam separator 92, as is known in the art.

Equations 14a–14e, found below, are used to compute the direction and the derivative of the perpendicular in three dimensions.

Equations 15a–16b, found below, define values used in Equations 17–18b.

Equation 17, found below, defines the minimum and maximum local power, $k_1$ and $k_2$, respectively.

Equation 18a, found below, defines the average power.

Equation 18b, found below, defines the cylinder power.

It is appreciated that other lens characteristics, such as axis, tilt, and coma, may also be computed with appropriate equations.

Equations 1–18b, referred to above, are as follows:

$$X_{ij}=x_i-x_j \tag{1}$$

$$Y_{ij}=y_i-y_j \tag{2}$$

$$\Delta x_i=x_i-x_i \tag{3a}$$

$$\Delta y_i=y_i-y_i \tag{3b}$$

$$\Delta X_{ij}=\Delta x_i-\Delta x_j \tag{4a}$$

$$\Delta Y_{ij}=\Delta y_i-\Delta y_j \tag{4b}$$

$$A=\Delta X_{12}\cdot\Delta Y_{13}-\Delta X_{13}\cdot\Delta Y_{12} \tag{5}$$

$$B=X_{12}\cdot\Delta Y_{13}+Y_{13}\cdot\Delta X_{12}-Y_{12}\cdot\Delta X_{13}-\Delta Y_{12} \tag{6}$$

$$C=X_{12}\cdot Y_{13}-X_{13}\cdot Y_{12} \tag{7}$$

$$d=B^2-4AC \tag{8}$$

$$F\text{max}=Z=\text{max}(((B+d)/2A).D;\ ((B-d)2A).D) \tag{9a}$$

$$F\text{min}=\text{min}(((B+d)/2A).D;\ ((B-d)2A).D) \tag{9a}$$

$$Cyl=F\text{max}-F\text{min} \tag{9c}$$

$$Sph(av)=(F\text{max}+F\text{min})/2 \tag{9d}$$

$$x_{mi}=x_i+\Delta x_i.Z/D \tag{10a}$$

$$y_{mi}=y_i+\Delta y_i.Z/D \tag{10a}$$

$$\alpha=x_{m2}-x_{m1} \tag{10c}$$

$$\beta=y_{m2}-y_{m1} \tag{10d}$$

$$Axe(\text{rad})=Arctg(\beta/\alpha) \tag{11}$$

$$X=\left(\sum_{i,j} i.I(i,j)\right)/\left(\sum_{i,j} I(i,j)\right) \tag{12a}$$

$$Y=\left(\sum_{i,j} j.I(i,j)\right)/\left(\sum_{i,j} I(i,j)\right) \tag{12b}$$

$$\Phi(\rho,\theta)=\sum_n\sum_m a_{mn}R_n^m(\rho)\cos m\theta \tag{13a}$$

$$n_1\sin(\theta_1)=n_2\sin(\theta_2) \tag{13b}$$

$$f_x=\tfrac{\partial z}{\partial x} \tag{14a}$$

$$f_y=\tfrac{\partial x}{\partial y} \tag{14b}$$

$$f_{xx}=\tfrac{\partial^2 z}{\partial x^2} \tag{14c}$$

$$f_{yy}=\tfrac{\partial^2 z}{\partial y^2} \tag{14d}$$

$$f_{xy}=\tfrac{\partial^2 z}{\partial x \partial y} \tag{14e}$$

$$E=1+f_x^2 \tag{15a}$$

$$F=f_x f_y \tag{15b}$$

$$G=1+f_y^2 \tag{15c}$$

$$N=(1+f_x^2+f_y^2)^{\tfrac{1}{2}} \tag{16A}$$

$$U=E.f_{yy}+G.f_{xx}-2f_x.f_y.f_{xy} \tag{16a}$$

$$k_{1,2}=\tfrac{1}{2N^3}\{U\pm[U^2-4N^2\cdot(f_{xx}\cdot f_{yy}-f_{xy}^2)]\}^{\tfrac{1}{2}} \tag{17}$$

$$P=_2^{(n-1)}(K_1=k_2) \tag{18a}$$

$$A=(n-1)(k_1\_k_2) \tag{18b}$$

STEP 115: Topography. A report of the characteristics of the optical element 87, such as a lens, is computed and output to the user. The report may be any of a number of reports representing the characteristics of the lens as, for example: a map of the power of the lens; a map of the cylinder of the lens; a map of the axis of the lens; a 3-dimensional wire frame map of the lens; a cross-section of the lens in any direction; a map of the radius of curvature of the lens; a map of differences between the test optical element and a reference optical element, in which case characteristics of a previously measured reference optical element are stored for use in computing the map of differences; an indication of the quality of the lens; an indication of acceptance or rejection of the lens according to predefined criteria chosen by the user.

Figure 19:
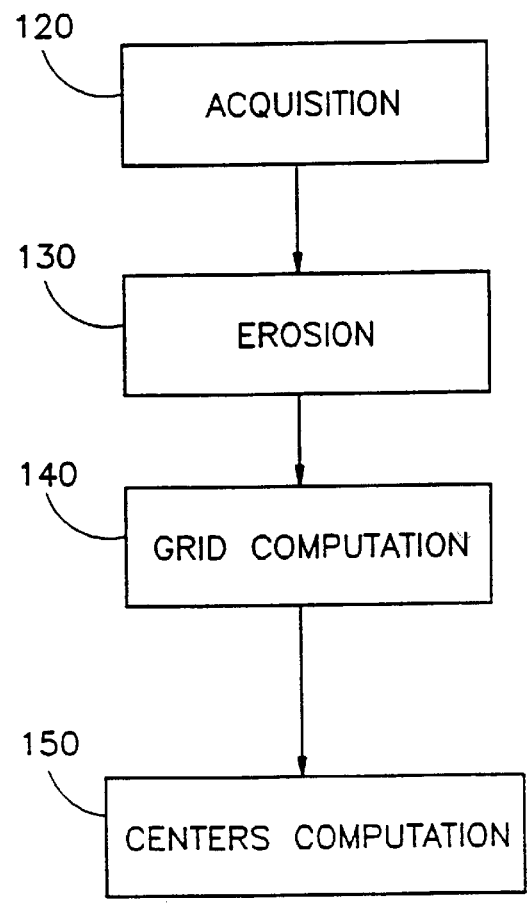
FIG. 19 is a simplified flow chart illustrating the operation of step 112 of FIG. 118A.

Reference is now made to FIG. 19 which is a simplified flow chart illustrating the operation of step 112 of FIG. 18A. The method of FIG. 19 preferably includes the following steps:

STEP 120: Acquisition. The gray levels of each pixel in the image are captured by the optical sensing device 94 and stored in memory by the optical element computation device 96. Preferably, a two-dimensional array of gray scale values is stored. The size of each pixel determines the precision of the measurement. An array of 512×512 pixels is preferred. Preferably, 256 gray levels are used, but alternatively another number of levels may be used.

STEP 130: Erosion. The two dimensional array of gray scale values stored in step 120 is examined in order to find the maximum brightness value for each test spot 98.

The array of pixels is examined by passing a two-dimensional window over the array and examining the pixels within the two-dimensional window. Preferably, the size of the window is large compared to the size of an individual spot and small compared to the distance between spots. Generally, the size of an individual spot and the distance between spots are known in advance as parameters of the system, particularly of the beam separator 92, as determined in step 105, described above. If necessary, the size of the window may be varied in step 100, described above.

The window passes over the array, moving one pixel at a time, so that the window visits each possible location in the array. At each location, a function of the gray scale values of all of the pixels within the window is computed. Preferably, the function is the local maximum over a threshold, typically the erosion threshold supplied in step 100 of FIG. 18A. The computed function value represents the local maximum of brightness.

As the window passes over the array, the local maxima of all window locations which represent maxima of brightness according to the computed function are stored in memory by computation device 96.

STEP 140: Grid computation.

Reference is now additionally made to FIGS. 20A and 20B, which are simplified pictorial illustrations of a result of step 140 of FIG. 19. FIG. 20A shows the results as applied to an array of calibration spots 97, and FIG. 20B shows the result as applied to an array of test spots 98. The illustration of FIG. 20B shows an example of a grid generated according to the method of step 140, connecting all of the test spots 98.

In order to compute the optical characteristics of the test optical element, it is necessary to determine, for each test spot 98, which is the corresponding calibration spot 97, that is, the calibration spot 97 produced by the same light beam which produces the individual test spot 98.

The array of locations of maximum, brightness computed in step 130 is examined, beginning at the center of the array, thereof. A grid connecting the locations of maximum brightness is created as follows:

The location of the missing microelement is first determined. For the sake of computation, it is assumed that any group of four calibration spots 97 or four test spots 98, arranged roughly in the shape of a rectangle, are roughly equally spaced. The calibration spots 97 and the test spots 98 are examined to find a place where there are two adjacent calibration spots 97 or test spots 98 at significantly greater distance than the generally equal distance, as for example 25% farther. The missing spot is taken to be between the spots which are at significantly greater distance, as shown for example in FIGS. 20A and 20B. Preferably, the missing spot is located by linear interpolation between the locations of the four closest spots 97 or 98.

The correspondence between the calibration spots 97 and the test spots 98 is then identified as follows:

Begin at the location of the missing microelement and associate the location of the missing spot of the calibration spots 97 with the location of the missing spot of the test spots 98;

For each location of maximum brightness of the test spots 98, the nearest eight locations of maximum brightness of the test spots 98 are identified;

Similarly, for each location of maximum brightness of the calibration spots 97, the nearest locations of maximum brightness of the calibration spots 97 are identified;

The eight calibration spots 97 and the geometrically corresponding eight test spot 98 found in the previous two steps are identified as associated spots, and each of the eight test spots 98 is assigned a label corresponding to the label of the associated calibration spot 97; and an indication is stored in memory of the computing device 96, representing lines connecting, horizontally and vertically, the current location and the eight nearest locations, of the calibration and test spots, as seen in FIGS. 20A and 20B.

The test spots 98 are thus identified relative to the calibration spots 97 by information other than the location of an individual test spot 98.

One of the nearest locations becomes the new current location so that the next nearest location can be identified, excluding any locations already identified. Any appropriate method may be used to traverse the locations in choosing the new current location, so that all locations are eventually traversed. Preferably, a method which optimizes search time is used. One example of a preferable method is a follows:

begin in the center of the image and choose a starting test spot 98 and process the chosen spot;

identify the four nearest neighbors of the test spot 93 in the horizontal and vertical directions;

choose one of the four nearest neighbors as the next spot and process the new chosen spot;

repeat the identify and choose steps.

It is appreciated that many other search methods may be used.

It will be appreciated that the above method associates each of the test spots 98 with the corresponding calibration spot 97 defines a grid connecting all of the test spots 98. Also, since the location of the missing microelement in the beam separator 92 corresponds to the missing spots of the calibration spots 97 and the test spots 98, the above method also associates each of the test spots 98 and each of the calibration spots 97 with the corresponding microelement in the beam separator 92 which produced said spots.

In case not all of the test spots are connected, parameters may be altered as described above in step 100 and the entire process may be performed again.

STEP 150: Centers computation. The center of brightness for each of the test spots 98 is computed with subpixel precision. The center of brightness may not be in the same location as the maximum computed above in step 130, typically due to quantization, noise, or other effects within the optical sensing device 94, with the maximum brightness being located off-center.

Preferably, the center of brightness is computed as follows. For center of brightness computation, a window centered around each brightness maximum for each of the test spots 98 is defined. The center of brightness window is similar to that described in step 130 but preferably of a size equal to the distance between two neighboring brightness maxima as computed in step 130. Within the window, the center of brightness coordinate is computed with subpixel precision using Equations 12a and 12b, referred to above, where the function I(i,j) is the gray value of the spots i,j. The center of gravity is taken as the position of the test spot 98.

Alternatively, in the case of a non-symmetrical distribution of light, a symmetrical polynomial such as a Bessel function or a Gaussian function, or a non-symmetrical function such as a Ksi distribution, may be chosen, and the best fit of the data to the chosen function may be computed. The position of spot 98 is defined as the x=0 and y=0 coordinate positions of the function. While this method may produce a precise result, the computations tend to be time consuming.

Reference is now made to FIGS. 21–28, which are simplified partly pictorial, partly block diagrams of eight different alternative configurations of the apparatus of FIGS. 17A and 17B.

Figure 21:
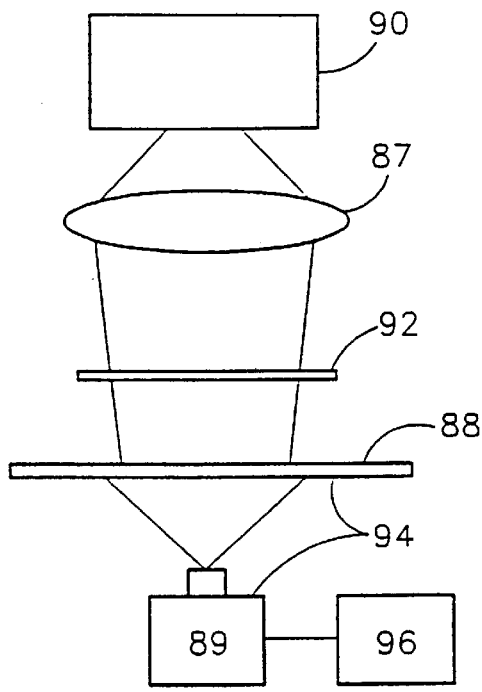
FIG. 21–28 are simplified partly pictorial, partly block diagrams of eight different alternative configurations of the apparatus of FIGS. 17A and 17B.

FIG. 21 shows a light transmission configuration using a spherical beam of light. The spherical beam may be either convergent or divergent. Preferably, the radius of curvature of the spherical beam is approximately the same as the radius of curvature of one of the two surfaces of the optical element 87. This is preferable because a beam with said radius of curvature will be generally unaffected by passing through the surface of the optical element 87 with a corresponding radius of curvature. A beam with such a radius of curvature is thus preferable for measuring only one surface of the optical element 87, namely the surface with a different radius of curvature.

Alternatively, preferable results in measuring an optical element 87 with high divergence may be obtained using a convergent beam, while preferable results in measuring an optical element 87 with high convergence may be obtained using a divergent beam.

Figure 22:
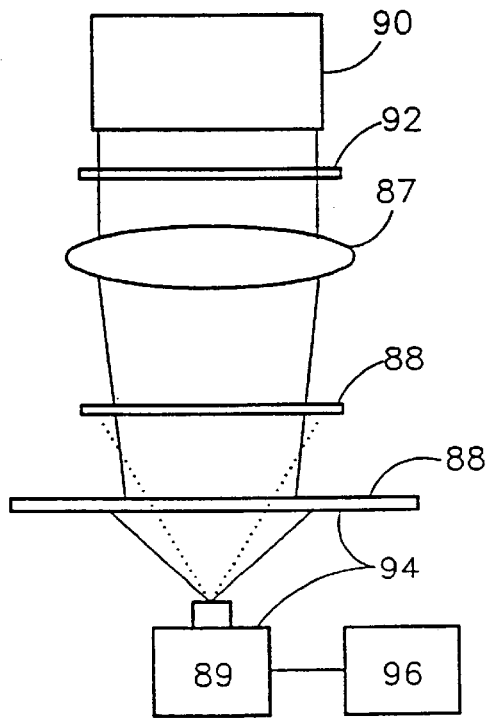

FIG. 22 shows a light transmission configuration using a parallel beam. The configuration of FIG. 22 comprises two screens 88, with the beam separator 92 being positioned before the optical element 87.

Figure 23:
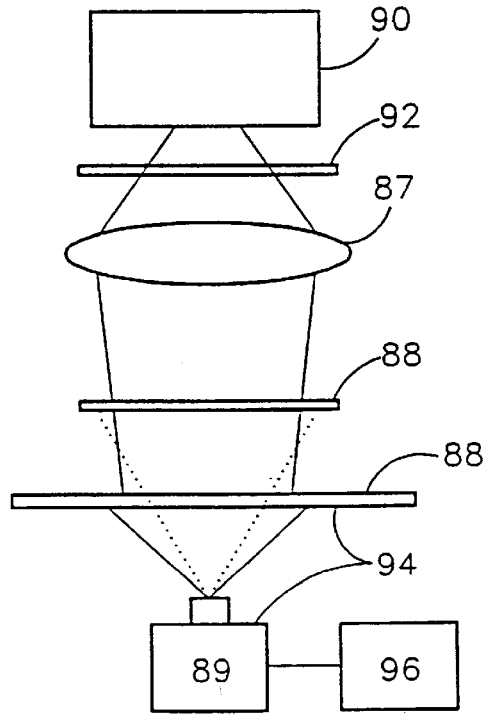

FIG. 23 shows a configuration similar to that of FIG. 22, but shows a light transmission configuration using a spherical beam.

Figure 24:
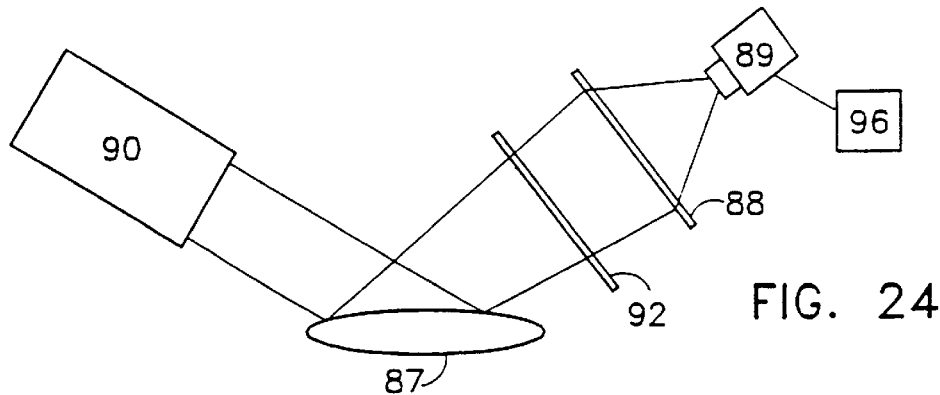

FIG. 24 shows a light reflection configuration using a parallel beam.

Figure 25:
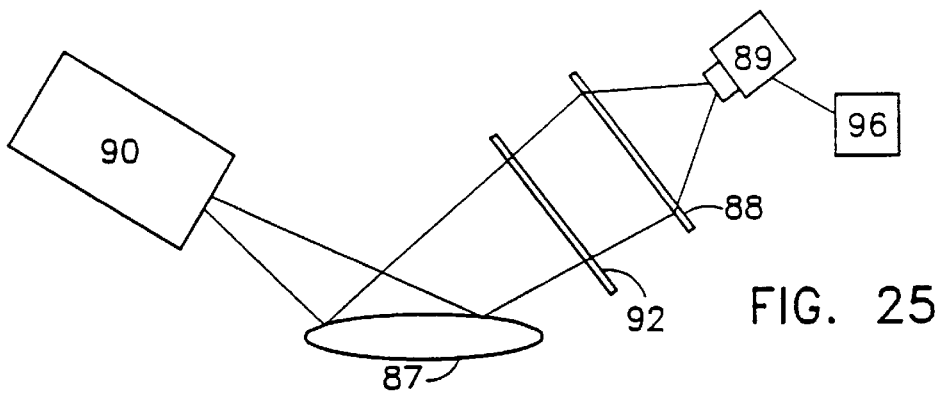

FIG. 25 shows a light reflection configuration using a spherical beam.

Figure 26:
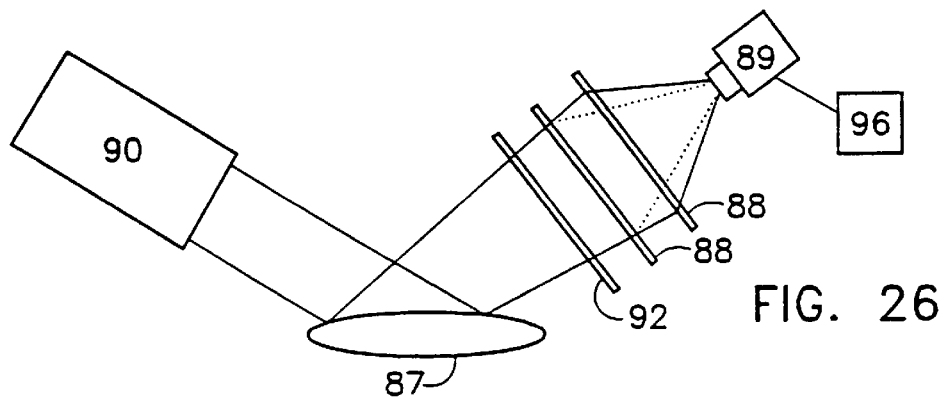

FIG. 26 shows a light reflection configuration using a parallel beam. The configuration of FIG. 26 comprises two screens 88.

Figure 27:
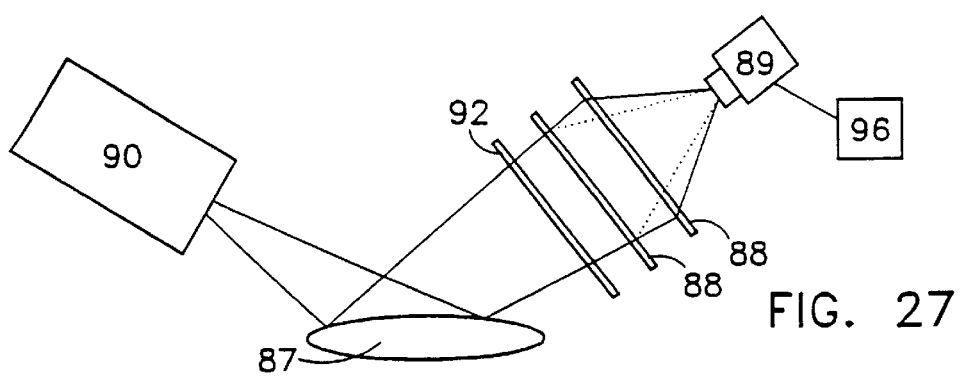

FIG. 27 shows a light reflection configuration using a spherical beam. The configuration of FIG. 27 comprises two screens 88.

Figure 28:
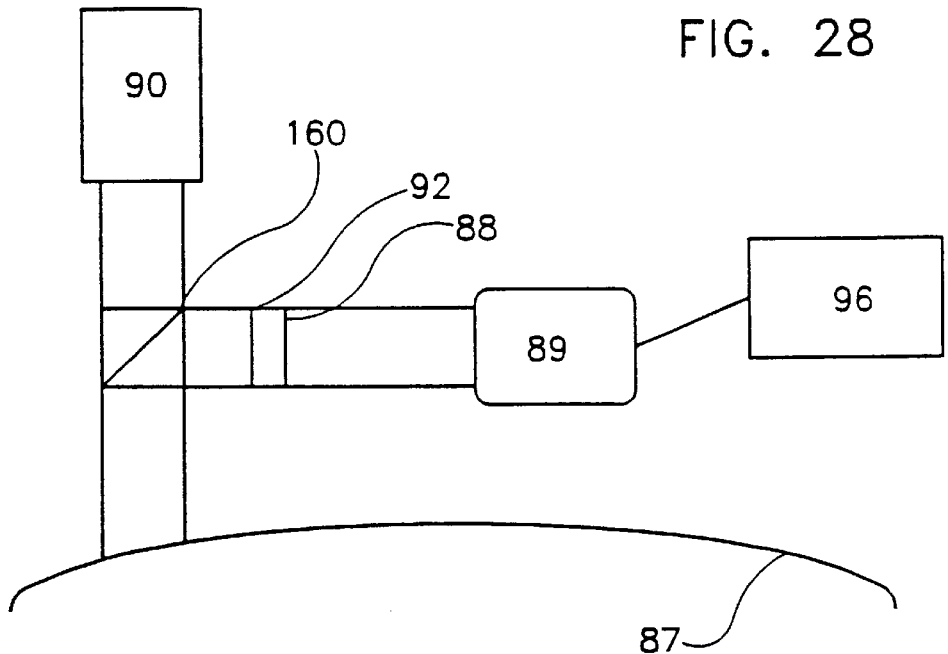

FIG. 28 shows a light reflection configuration with a small light beam moving on the lens. The configuration of FIG. 28 includes a beam splitter 160, positioned between the light source 90 and the optical element 87. The beam splitter 160 is operative to split the light beam and direct the portion of the light beam which reflected from the optical element 87 toward the camera 89. This is desirable because the light path to and from the optical element 87 is thus kept close to the optical axis of the optical element 87, so that the light follows a common optical path.

It is appreciated that the configurations of FIGS. 24–27 may similarly incorporate a beam splitter.

Figure 29:
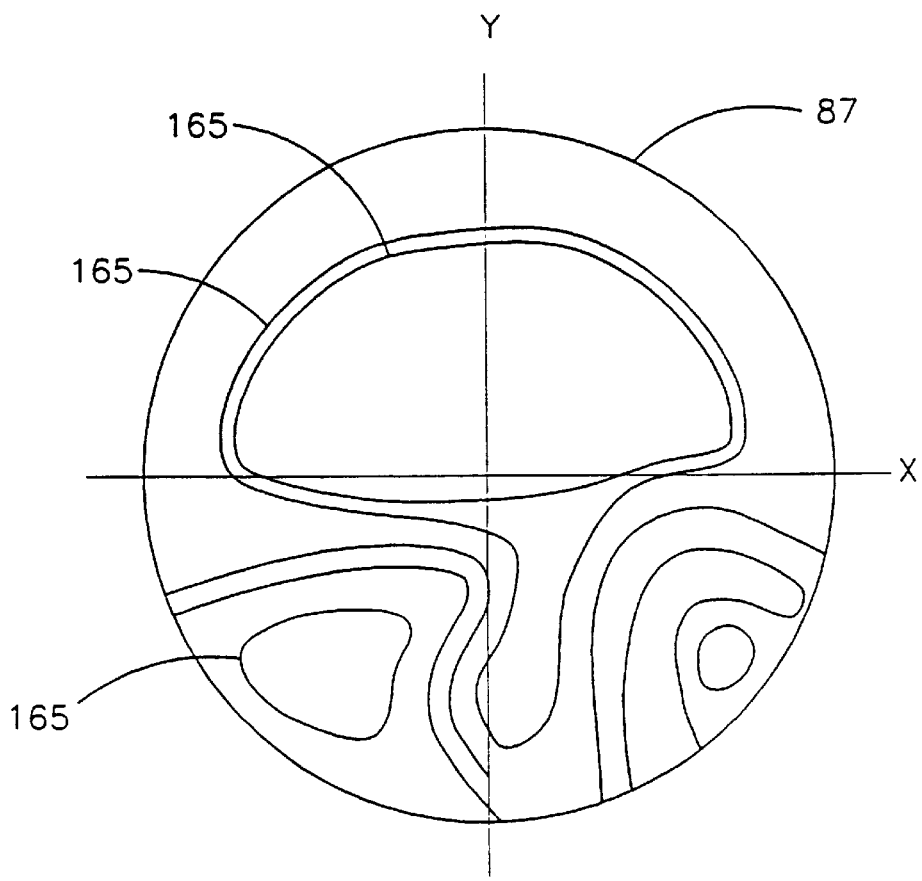
FIG. 29 is a simplified pictorial illustration of a cylinder map a progressive lens, as produced by the apparatus of FIG. 17A and 17B.

Reference is now made to FIG. 29, which is a simplified pictorial illustration of a cylinder map of a progressive lens, as produced by the apparatus of FIGS. 17A and 17B. The cylinder map of FIG. 29 comprises cylinder isopower lines 165, as are well known in the ophthalmic art. It is appreciated that the apparatus of FIGS. 17A and 17B, and of FIGS. 21–28, is capable of producing a wide variety of different outputs indicating measurements performed on the optical element 87. FIG. 29 is presented by way of example only.

It is appreciated that there are a number of alternative configurations of the apparatus of the present invention. The configurations described above are described by way of example only, and are not intended to be limiting.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. Apparatus for mapping an optical element, the apparatus comprising:

a light source arranged to transmit a light beam toward the optical element, a beam separator including a plurality of beam separating elements which are operative to separate the light beam into a corresponding plurality of light beam portions including at least first and second light beam portions which may be distinguished from one another;

an optical sensing device operative to generate a light spot map including a plurality of light spots corresponding to said plurality of beam separating elements, each light spot comprising an intersection between a corresponding light beam portion and a plane disposed within the field of view or the optical sensing device; and an optical element characteristic computation device operative to derive at least one characteristic of each of at least two locations within the optical element from said light spot map and including apparatus for identifying the beam separating element corresponding to an individual spot based at least partly on distinguishing said first and second light beam portion from each other.

2. Apparatus according to claim 1, wherein said light spot map comprises a digital light spot map.

3. Apparatus according to claim 1, wherein said light spot map comprises an analog light spot map.

4. Apparatus according to claim 1, wherein said beam separator comprises an LCD (liquid crystal device).

5. Apparatus according to claim 1, wherein said beam separator comprises an array of microlenses.

6. Apparatus according to claim 1, wherein said beam separator comprises a hole plate.

7. Apparatus according to claim 1, wherein said optical sensing device comprises a CCD camera.

8. Apparatus according to claim 1, wherein said optical sensing device comprises an IR camera.

9. Apparatus according to claim 1, wherein said optical sensing device comprises a photographic film.

10. Apparatus according to claim 1, wherein said optical sensing device comprises a PSD (position sensor detector).

11. Apparatus according to claim 1, wherein the light source comprises a point source.

12. Apparatus according to claim 1, wherein the light source comprises a coherent light source.

13. Apparatus according to claim 12, wherein said coherent light source comprises a laser source.

14. Apparatus according to claim 1, wherein the light source comprises a noncoherent light source.

15. Apparatus according to claim 14, wherein said noncoherent light source comprises one of the following:

a tungsten light source; and a halogen light source.

16. Apparatus according to claim 1, wherein said apparatus for identifying also employs information regarding the location of the spot to identify a beam separating element corresponding to an individual spot.

17. Apparatus according to claim 1, wherein said light source comprises a parallel light source operative to transmit parallel light toward the optical element.

18. Apparatus according to claim 1, wherein said light source comprises a convergent light source operative to transmit converging light toward the optical element.

19. Apparatus according to claim 1, wherein said light source comprises a divergent light source operative to transmit diverging light toward the optical element.

20. Apparatus according to claim 1, wherein said computation device is operative to derive at least one local characteristic of the optical element.

21. Apparatus according to claim 11, and also comprising a beam splitter positioned between the light source and the optical element which is operative to split the light beam as it returns from the optical element toward the optical sensing device.

22. Apparatus according to claim 1, wherein said optical sensing device is on one side of the optical element and said light source is on the other side of the optical element.

23. Apparatus according to claim 1, wherein the at least one characteristic of the optical element comprises at least one characteristic of only one surface of the optical element.

24. Apparatus according to claim 1, wherein said plurality of beam separating elements includes at least first and second beam separating elements with different transmission properties.

25. Apparatus according to claim 24, wherein said first beam separating element comprises an element which absorbs a portion of the beam.

26. Apparatus according to claim 1 wherein said plurality of beam separating elements includes an array of beam separating elements in which at least one individual beam separating element is missing.

27. Apparatus according to claim 26 wherein said missing individual beam separating element is disposed substantially in the middle of the array.

28. Apparatus according to claim 1 wherein the light beam travels along a path extending from the light source, through the beam separator and the optical element, to the optical sensing device.

29. A method for mapping a multifocal ophthalmic element, the method comprising:

illuminating a multifocal ophthalmic element with a light beam;

providing a first plurality of beam separating elements operative to separate the light beam into a corresponding first plurality of light beam portions;

generating a digital light spot map including a first plurality of light spots corresponding to said first plurality of beam separating elements; and for each of a second plurality of locations within the ophthalmic element, deriving at least one multifocal ophthalmic element location characteristic.

30. A method according to claim 29, wherein said ophthalmic element comprises an ophthalmic lens.

31. A method according to claim 29, wherein said ophthalmic element comprises an ophthalmic mold.

32. A method according to claim 30, wherein said ophthalmic lens comprises a contact lens.

33. A method according to claim 32, wherein said contact lens comprises a hard contact lens.

34. A method according to claim 32, wherein said contact lens comprises a soft contact lens.

35. A method according to claim 34, wherein said soft contact lens is immersed in a solution.

36. A method according to claim 30, wherein said ophthalmic lens comprises an intraocular lens.

37. A method according to claim 29, wherein the at least one ophthalmic element characteristic comprises at least one ophthalmic characteristic of only one surface of the ophthalmic element.

38. A method for mapping a soft contact lens element, the method comprising:

illuminating a soft contact lens element with a light beam;

providing a first plurality of beam separating elements operative to separate the light beam into a corresponding first plurality of light beam portions;

generating a digital light spot map including a first plurality of light spots corresponding to said first plurality of beam separating elements; and for each of a second plurality of locations within the lens element, deriving at least one soft contact lens element location characteristic.

39. A method according to claim 38, wherein said soft contact lens element is immersed in a solution.

40. Apparatus for mapping an ophthalmic lens, the apparatus comprising:

a light source arranged to transmit light toward the ophthalmic lens;

a beam separator including a plurality of beam separating elements operative to separate a light beam into a corresponding plurality of light beam portions;

an optical sensing device operative to generate a digital light spot map including a plurality of light spots corresponding to said plurality of beam separating elements, each light spot comprising an intersection between a corresponding light beam portion and a plane disposed within the field of view of the optical sensing device; and an ophthalmic characteristic map generating device operative to generate a map of an ophthalmic characteristic of the ophthalmic lens based on said light spot map.

41. Apparatus according to claim 40, wherein said ophthalmic characteristic map comprises an astigmatism map.

42. Apparatus according to claim 40, wherein said ophthalmic characteristic map comprises an axis map.

43. Apparatus according to claim 40, wherein said ophthalmic characteristic map comprises a tilt map.

44. Apparatus according to claim 40, wherein said ophthalmic characteristic map comprises a curvature radius map.

45. A method for mapping an IR optical element, the method comprising:

illuminating an IR optical element with a light beam;

providing a first plurality of beam separating elements operative to separate the light beam into a corresponding first plurality of light beam portions;

generating a digital light spot map including a first plurality of light spots corresponding to said first plurality of beam separating elements; and for each of a second plurality of locations within the IR optical element, deriving at least one IR optical element location characteristic.

46. A method according to claim 45, wherein the at least one IR optical element characteristic comprises at least one IR optical element characteristic of only one surface of the IR optical element.

47. Apparatus for mapping a multifocal ophthalmic element comprising:

a light source for illuminating a multifocal ophthalmic element;

a first plurality of beam separating elements operative to separate a light beam into a corresponding first plurality of light beam portions;

a digital light spot map generator operative to generate a first plurality of light spots corresponding to said first plurality of beam separating elements, each light spot comprising an intersection between a corresponding light beam portion and a plane disposed within the field view of the optical sensing device; and an ophthalmic element location characterizer operative to derive at least one multifocal ophthalmic element location characteristic, for each of a second plurality of locations within the ophthalmic element.

48. Apparatus according to claim 47, and also comprising:

an aberration polynomial computation device operative to derive an aberration polynomial characterizing the ophthalmic element from said light spot map.

49. Apparatus for mapping an optical element, the apparatus comprising:

a light source arranged to transmit a light beam toward the optical element;

a beam separator including a plurality of beam separating elements operative to separate a light beam arriving from the light source into a corresponding plurality of light beam portions before impingement of the light beam on the optical element;

an optical sensing device operative to generate a digital light spot map including a plurality of light spots corresponding to said plurality of beam separating elements, each light spot comprising an intersection between a corresponding light beam portion and a plane disposed within the field of view of the optical sensing device; and an optical element characteristic computation device operative to derive at least one characteristic of each of at least two locations within the optical element from said light spot map.

50. Apparatus according to claim 49, wherein the at least one characteristic of the optical element comprises at least one characteristic of only one surface of the optical element.

* * * * *